(12) United States Patent
Ladd

(10) Patent No.: US 9,660,497 B2
(45) Date of Patent: May 23, 2017

(54) CORDLESS PORTABLE PUMP DEVICE

(71) Applicant: Scott W. Ladd, Penobscot, ME (US)

(72) Inventor: Scott W. Ladd, Penobscot, ME (US)

(*) Notice: Subject to any disclaimer, the term of this patent is extended or adjusted under 35 U.S.C. 154(b) by 417 days.

(21) Appl. No.: 14/502,761

(22) Filed: Sep. 30, 2014

(65) Prior Publication Data

US 2016/0094105 A1 Mar. 31, 2016

(51) Int. Cl.
*H02K 11/00* (2016.01)
*H02K 5/132* (2006.01)
*F04B 17/03* (2006.01)
*F04B 17/06* (2006.01)
*F04D 13/06* (2006.01)
*F04D 13/08* (2006.01)

(52) U.S. Cl.
CPC ............ *H02K 5/132* (2013.01); *F04B 17/03* (2013.01); *F04B 17/06* (2013.01); *F04D 13/068* (2013.01); *H02K 11/00* (2013.01); *H02K 11/0094* (2013.01); *F04D 13/086* (2013.01)

(58) Field of Classification Search
CPC .... H02K 11/0094; H02K 11/00; H02K 5/132; F01B 1/00

USPC ............................................ 310/71; 417/234
See application file for complete search history.

(56) References Cited

U.S. PATENT DOCUMENTS

| | | | |
|---|---|---|---|
| 5,669,323 A * | 9/1997 | Pritchard | F04D 29/605 |
| | | | 114/183 R |
| 6,290,469 B1 * | 9/2001 | Archibald | F04B 17/03 |
| | | | 417/234 |
| 6,447,261 B1 | 9/2002 | McCook | |
| 7,841,286 B1 | 11/2010 | Bochenski | |
| 2006/0073040 A1 | 4/2006 | Metzger et al. | |
| 2007/0048157 A1 * | 3/2007 | Collins | F04D 15/0218 |
| | | | 417/423.3 |
| 2011/0133582 A1 * | 6/2011 | Bingler | F04B 17/03 |
| | | | 310/71 |
| 2011/0260540 A1 * | 10/2011 | Jan | B60R 16/033 |
| | | | 307/66 |
| 2013/0052059 A1 | 2/2013 | Moormann et al. | |
| 2014/0184032 A1 * | 7/2014 | Gentil | H02K 11/0047 |
| | | | 310/68 C |

* cited by examiner

*Primary Examiner* — Hanh Nguyen
(74) *Attorney, Agent, or Firm* — Anthony D. Pellegrini

(57) ABSTRACT

A cordless portable pump device comprising a submersible pump, wiring means capable of conducting electrical current, a power supply comprising a rechargeable battery pack from a commercially available portable power tool having a voltage rating of at least fourteen volts, and a power receptacle suitably adapted to receive and retain the power supply.

13 Claims, 4 Drawing Sheets

CORDLESS PORTABLE PUMP DEVICE

CROSS REFERENCE TO RELATED APPLICATIONS

This application further claims priority to a provisional application, U.S. Ser. No. 61/921,563, filed Dec. 30, 2013, entitled Cordless Bilge Pump, by Ladd, Scott W., which is hereby incorporated by reference.

BACKGROUND OF THE INVENTION

1. Technical Field

The present invention relates generally to pumping devices and more specifically relates to a portable pumping device using a rechargeable battery for removing fluids from undesired locations.

2. Description of Prior Art

Bilge pumps are essential for removing standing water from boats, household appliances, and any other object that may experience flooding or water-based malfunctions. Bilge pumps may be hand operated, or electrically powered. Electrically powered pumps may require a cord and must be plugged into an A/C outlet. Other electrically powered pumps run on D/C current and use batteries. Most battery operated bilge pumps run on a 12 volt battery.

The prior art discloses various configurations of battery powered pumps. For example, U.S. Pat. Appl. No. 2013/0052059, to Moormann, et al., for a "Portable Battery Operated Bilge Pump" discloses a pump featuring a housing and battery configuration, where the housing is configured with a battery receiving portion having electrical terminals for receiving power to the pump. While this invention has the advantages of being portable and uses a rechargeable battery, it has the disadvantage of requiring a specially configured rechargeable battery. Thus, only those batteries specially made to fit the housing can be used. This is necessarily a more expensive set up, and is less convenient, for example, if replacement batteries are difficult to find.

U.S. Pat. Appl. No. 2006/0073040, to Metzger, et al., for an "Air Pump For An Inflatable Product", discloses a pump that uses disposable dry cells to power a low torque electric motor. While this invention does not rely on a specially configured battery, and disposable dry cells are convenient to purchase, the use of such cells does not provide adequate power to move necessary quantities of fluid. A user will be forced to constantly replace depleted batteries, and fluid removal could take unacceptably long to accomplish.

U.S. Pat. No. 7,841,286, to Bochenski, for an "Automatic Bilge Pump System", discloses a pump using disposable dry cell batteries. This invention suffers from the same drawbacks as the Metzger, et al., device.

U.S. Pat. No. 6,447,261, to McCook, for a "Portable Bilge Pump Assembly", discloses a portable bilge pump for providing portable water pumping capabilities without an external power source. The portable bilge pump assembly includes a pump member which is submersible and designed for pumping water, a hose member which is coupled to the pump member and designed for carrying water from the pump member to an area selected by the user for dumping, and an handle assembly which is pivotally coupled to the pump member. This device is configured for ease of use. However, like the previous devices, it uses standard dry cell batteries or low voltage rechargeable batteries.

U.S. Pat. No. 5,669,323, to Pritchard, for an "Automatic Bailer", discloses a device that is used to remove water from an open vessel such as a whitewater canoe. The bailer utilizes a submersible pump that is connected to a power supply through flexible connections. However, the battery used is a large, rechargeable 12 volt battery and is meant to be fixed to the floor of the open vessel.

Each of the disclosed prior art devices fails to provide a practical solution to the need for a portable pump device that runs on standard rechargeable high powered batteries to quickly and efficiently remove fluid.

It is therefore shown that there is a need for a pump device for removing fluid from an environment that is portable, powerful, and easy and convenient to use.

It is therefore an object of the present invention to provide a cordless portable pump device suitable for removing fluid from an environment.

Another object of the present invention is to provide a cordless portable pump device that is powered by rechargeable batteries.

Yet another object of the present invention is to provide a cordless portable pump device that uses relatively high voltage rechargeable batteries for extra power and longer life.

Yet another object of the present invention is to provide a cordless portable pump device that uses readily available standard rechargeable batteries manufactured for cordless hand tools.

Yet another object of the present invention is to provide a cordless portable pump device that is easy to position and manipulate.

Yet another object of the present invention is to provide a cordless portable pump device that is easy to maintain.

Yet another object of the present invention is to provide a cordless portable pump device that is easy and inexpensive to manufacture.

Other objects and advantages of the present invention will become obvious to the reader and it is intended that these objects and advantages are within the scope of the present invention. To the accomplishment of the above and related objects, this invention may be embodied in the form illustrated in the accompanying drawings. Attention is called to the fact, however, that the drawings are illustrative only, and that changes may be made in the specific construction illustrated and described within the scope of this disclosure.

BRIEF SUMMARY OF THE INVENTION

The present invention enables a person to quickly remove standing water from a boat, water basin, household appliance or other relevant object. The present invention prevents a boat from flooding and sinking and eliminates the need to manually pump water. Additionally, both time and labor associated with maintaining a small boat are reduced. The present invention decreases the risk of mold, mildew and toxins that may accumulate inside a boat or other space. This can invention may benefit boat owners, fishermen, contractors, and appliance repair professionals, those employed at marinas and yacht clubs, and more.

The present invention accomplishes the foregoing by utilizing the power of readily available rechargeable batteries manufactured for portable power tools. Such batteries are in wide use and have the advantage of being both powerful and having long life before becoming discharged. They also are already owned by many consumers, thus obviating the need to purchase costly special purpose batteries or underpowered disposable batteries.

The device further incorporates a standard submersible pump which is powered by the above-described rechargeable battery. In a preferred embodiment the pump is located at the bottom of an elongate extension member, while the battery is located at the top of the extension member. This allows the pump to be placed into the environment needing fluid removal, while keeping the battery above the fluid and thus dry.

Additional embodiments may include elements adding convenience of use, such as a handle, a remote switch, a flexible discharge hose, and separation joints in the extension member to allow for easy cleaning and compact storage.

There has been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of the construction or to the arrangements of the components set forth in the following description or drawing. The invention is capable of other embodiments and of being practiced and carried out in various ways. Also, it is to be understood that the phraseology and terminology employed herein are for the purpose of the description and should not be regarded as limiting.

Various other objects, features and attendant advantages of the present invention will become fully appreciated as the same becomes better understood when considered in conjunction with the accompanying drawings.

DETAILED DESCRIPTION OF THE INVENTION

Figure 1:
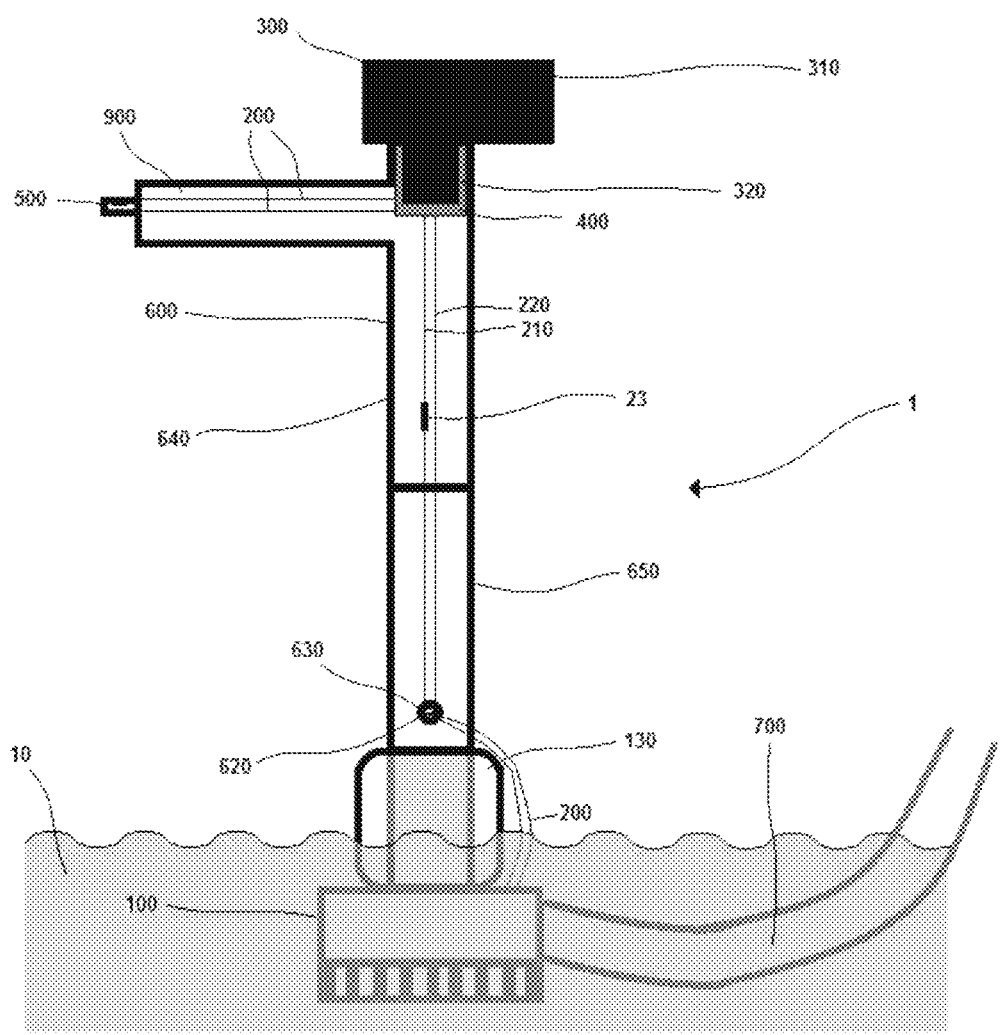
FIG. 1 depicts a schematic plan side view of one embodiment of the present invention.

The invention of the present invention is a cordless portable pump device 1 comprising a submersible pump 100, wiring means 200, a power supply 300, and a power receptacle 400. See FIG. 1.

The submersible pump 100 has a housing 110 and an electric motor 120 contained within the housing 110. See FIG. 3. The pump 100 can be any submersible electric pump known in the art which is suitable for taking in a fluid substance 10 into the housing 110 and expelling the fluid substance 10 from the housing 110. In the preferred embodiments the pump 100 does not have an automatic switch, such as a float switch, but rather is activated by a manual switch. The pumping mechanism can be of any suitable configuration. The housing 110 of the pump 100 can be made of any suitable material, with plastic being the preferred material. The housing 110 of the pump 100 may have an intake means configured in any manner, suitable for allowing fluid 10 to enter into the housing 110. The housing 110 of the pump 100 may have an outflow means configured in any manner, suitable for allowing fluid 10 to be discharged from the housing 110 by the pumping mechanism. In the preferred embodiments the outflow means is a flexible discharge hose 700, whereby the discharge hose 700 is in connection with the pump housing 110 and capable of carrying away the fluid substance 10 expelled by the pump 100. The discharge hose 700 can be of any suitable length so that the fluid 10 can be directed over the side of a boat, or into a bucket, or wherever desired by the user.

The wiring means 200 of the device 1 comprises one or more wires, of suitable length, each said wire capable of conducting electrical current. The one or more wires of the wiring means 200 may be plastic coated or otherwise coated, as is known in the art. In the preferred embodiments the wiring means 200 has at least a positive lead 210, a negative lead 220, and an inline fuse 230 integrated with the positive lead 210. Additional positive and negative leads 210,220 may be used as well, for example, to integrate a remote switch.

The power supply 300 comprises a rechargeable battery pack 310 from a commercially available portable power tool having a voltage rating of at least fourteen volts. See FIG. 2. Such commercially available rechargeable battery packs 310 are available from Dewalt®, Mikita®, Black & Decker®, Ryobi®, Milwaukee®, and many other manufacturers. Such rechargeable battery packs 310 typically incorporate lithium ion batteries, though other types of batteries may also be used. These battery packs 310 are charged by a battery recharger and are used with many different kinds of hand held power tools, such as electric drills, sanders, circular saws, shop lights, hammer drills, and the like. Each of these battery packs 310 also has an insertion member 320. The insertion member 320 is elongate and has one or more electrical contacts 322 thereupon, with the one or more electrical contacts 322 being in electrical engagement with the rechargeable battery 310. The insertion member 320 is specially configured to be inserted into the various power tools, as well as into the battery recharger. Each manufacturer configures its insertion member 320 and associated one or more electrical contacts 322 somewhat differently from that of each other manufacturer, such that one manufacturer's rechargeable battery pack 310 tends not to fit into the battery recharger or power tools made by another manufacturer.

Figures 2, 3:
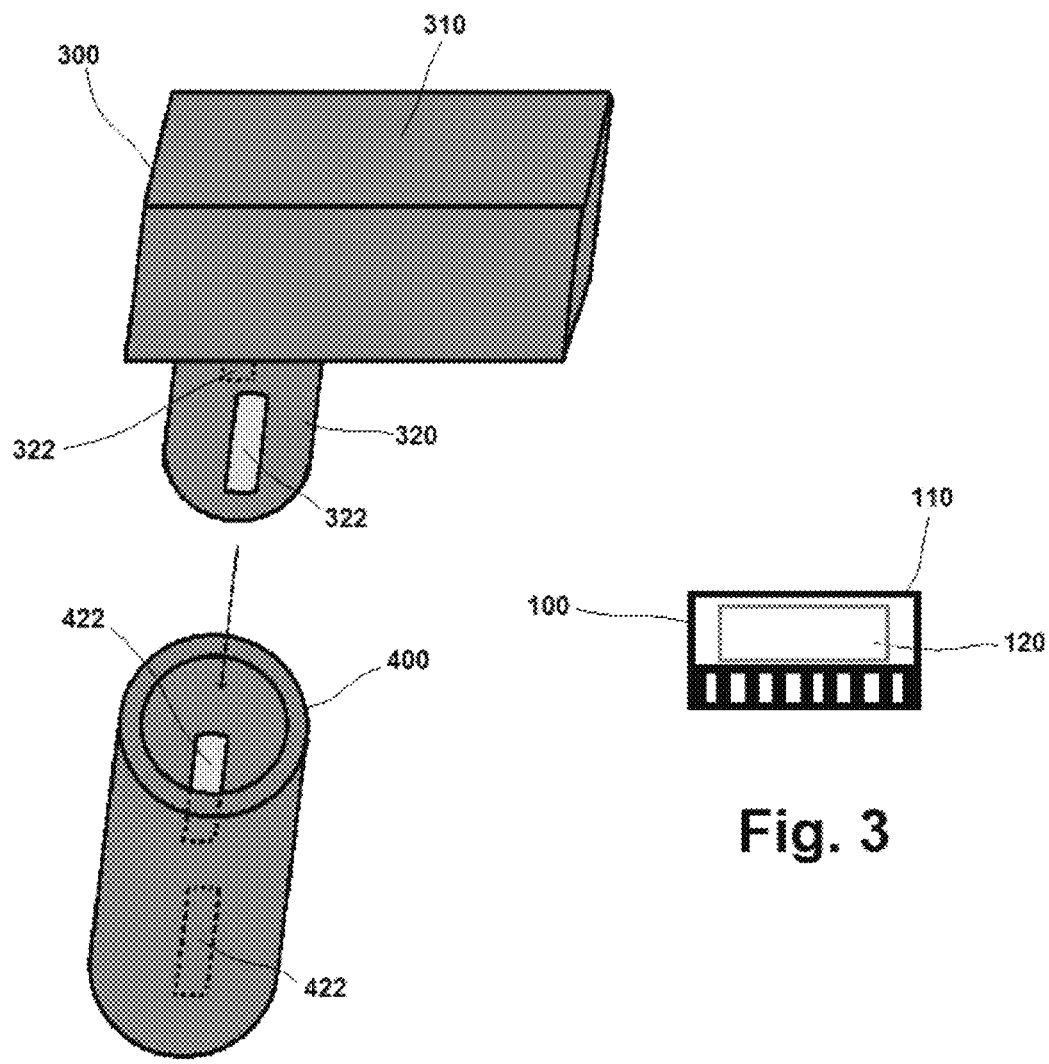
FIG. 2 depicts a schematic perspective view of the power supply and the power receptacle of one embodiment of the present invention. Certain hidden elements are shown in ghost line.
FIG. 3 depicts a schematic plan side view of the electric submersible pump of one embodiment of the present invention. A representation of the electric motor, a hidden element, is shown in gray.

The power receptacle 400 of the present invention is in connection with the electric pump motor by the wiring means 200. It is suitably adapted to receive and retain the insertion member 320 of the power supply 300. As such, it is substantially cylindrical and has a substantially hollow interior with an opening to the exterior. Other configurations are also contemplated, such as hollow tubes with substantially squared cross sections or other cross sectional shapes. Within the interior of the power receptacle 400 are one or more electrical contacts 422. These electrical contacts 422 are in electrical connection with the wiring means 200. These electrical contacts 422 are further suitably adapted to engage with the one or more electrical contacts 322 of the insertion member 320 of the power supply 300, thus establishing an electrical connection from the power supply 300 to the electric pump motor through the wiring means 200 when the associated electrical contacts 322,422 of the power receptacle 400 and the insertion member 320 of the power supply 300 engage with each other. As shown in FIG. 2, in one embodiment electrical contacts 322 are located on the outer sides of the insertion member 320 of the power supply 300, and other electrical contacts 422 are located on the inner sides of the power receptacle 400. When the insertion member 320 of the power supply 300 is inserted into the power receptacle 400 the electrical contacts 322 of the power supply 300 align with the electrical contacts 422 of the power receptacle 400. In other embodiments the electrical contacts 322 of the power supply 300 may be located on the bottom of the insertion member 320 while the electrical contacts 422 of the power receptacle 400 may be located on the inner floor of the power receptacle 400. Fully inserting the insertion member 320 into the power receptacle 400 brings the electrical contacts 322,422 into engagement with each other. Yet other embodiments have other configurations of electrical contacts 322,422.

In some embodiments of the present invention, the device 1 further comprises a switch 500. The switch 500 can be any known switch that is capable of being in connection with the power receptacle 400 and the wiring means 200, such that the switch 500 can control whether power is to be supplied to the electric motor 120 of the pump 100 or not. Thus, when the switch 500 is placed into an on position power from the power supply 300 is conveyed to the electric motor 120 via the wiring means 200 and the pump 100 is operational, and when the switch 500 is placed into an off position power from the power supply 300 is not conveyed to the electric motor 120 and the pump 100 is not operational. The switch 500 can be a toggle, a slide, a button, a dial, or any other suitable configuration. The positive lead 210 of the wiring means 200 is interrupted by the switch 500, so that when the switch 500 is in the on position there is continuity of the positive lead 210 on either side of the switch 500, and when the switch 500 is in the off position there is a break in continuity in the positive lead 210. The switch 500 may be located on the power receptacle 400, on the pump housing 110, or in any other convenient location on the device 1. In embodiments without a switch, the device 1 is activated by inserting the power supply 300 into the power receptacle 400 and the device 1 is deactivated by removing the power supply 300 from the power receptacle 400.

Figure 4:
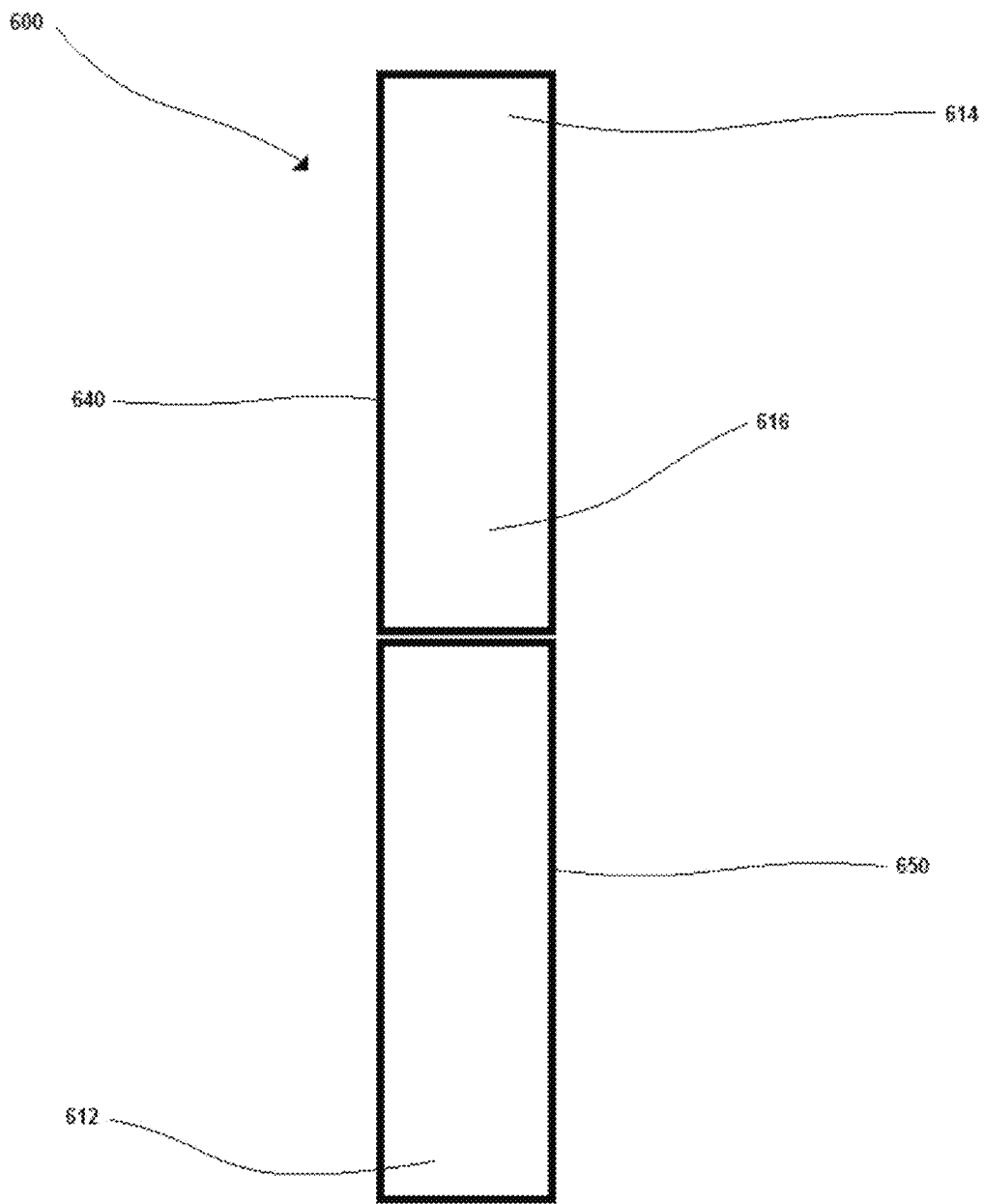
FIG. 4 depicts a schematic plan side view of the extension member of one embodiment of the present invention.

In the preferred embodiments of the present invention the device 1 further comprises an extension member 600. The extension member 600 is substantially elongate and has a proximate end 612, a distal end 614, and a hollow interior 616. See FIG. 4. The extension member 600 may be constructed of any suitable, substantially rigid material. It may be of any suitable length. In the preferred embodiments it is constructed of polyvinyl chloride (PVC) pipe. The housing 110 of the pump 100 is attached to the proximate end 612 of the extension member 600. The power receptacle 400 is attached to the distal end 614 of the extension member 600. In the most preferred embodiments the wiring means 200 are contained substantially within the hollow interior 616 of the extension member 600. In these embodiments, the proximate end 612 of the extension member 600 has an aperture 620 into which is fitted a rubber grommet 630; the aperture 620 allows for the passage of the wiring means 200 from the interior 616 of the extension member 600 to the exterior, to be connected with the pump 100. See FIG. 1. In alternative embodiments the wiring means 200 remains contained within the extension member 600 and connects with the pump 100 from within the extension member 600.

The extension member 600 may be fixedly attached at its proximate end 612 to the housing 110 of the pump 100. This could be achieved by any suitable means, such as an adhesive, mechanical fasteners, and the like. In the preferred embodiments the extension member 600 is removably attached at its proximate end 612 to the housing 110 of the pump 100. This is accomplished by use of a coupling member 130. This allows the pump 100 to be separated from the extension member 600. The coupling member 130 may contain threads which engage threads formed into the proximate end 612 of the extension member 600, or the proximate end 612 of the extension member 600 may be friction fit to the coupling member 130, or mechanical fasteners may be used. This configuration is useful for providing access to the wiring means 200 when the wiring means 200 are contained entirely within the extension member 600. In yet other embodiments, the extension member 600 is comprised of a first component 640 and a second component 650, with the first component 640 being removably attached to the second component 650. Detaching the first component 640 from the second component 650 provides access to the hollow interior 616 of the extension member 600. See FIG. 4. The first and second components 640,650 of the extension member 600 may contain threads which engage with each other, or they may be friction fit to each other, or mechanical fasteners may be used. This configuration allows for disassembly of the device 1 for more convenient storage, as well as providing access to the wiring means 200.

In some embodiments the device 1 further comprises a handle 900. See FIG. 1. The handle 900 is preferably integrated with the extension member 600. In preferred embodiments the handle 900 extends substantially perpendicularly from the extension member 600 at a location at or near the distal end 614 of the extension member 600. This provides the user a more convenient grip. Where a handle 900 is used, the switch 500 may be located on the handle 900.

Figure 5:
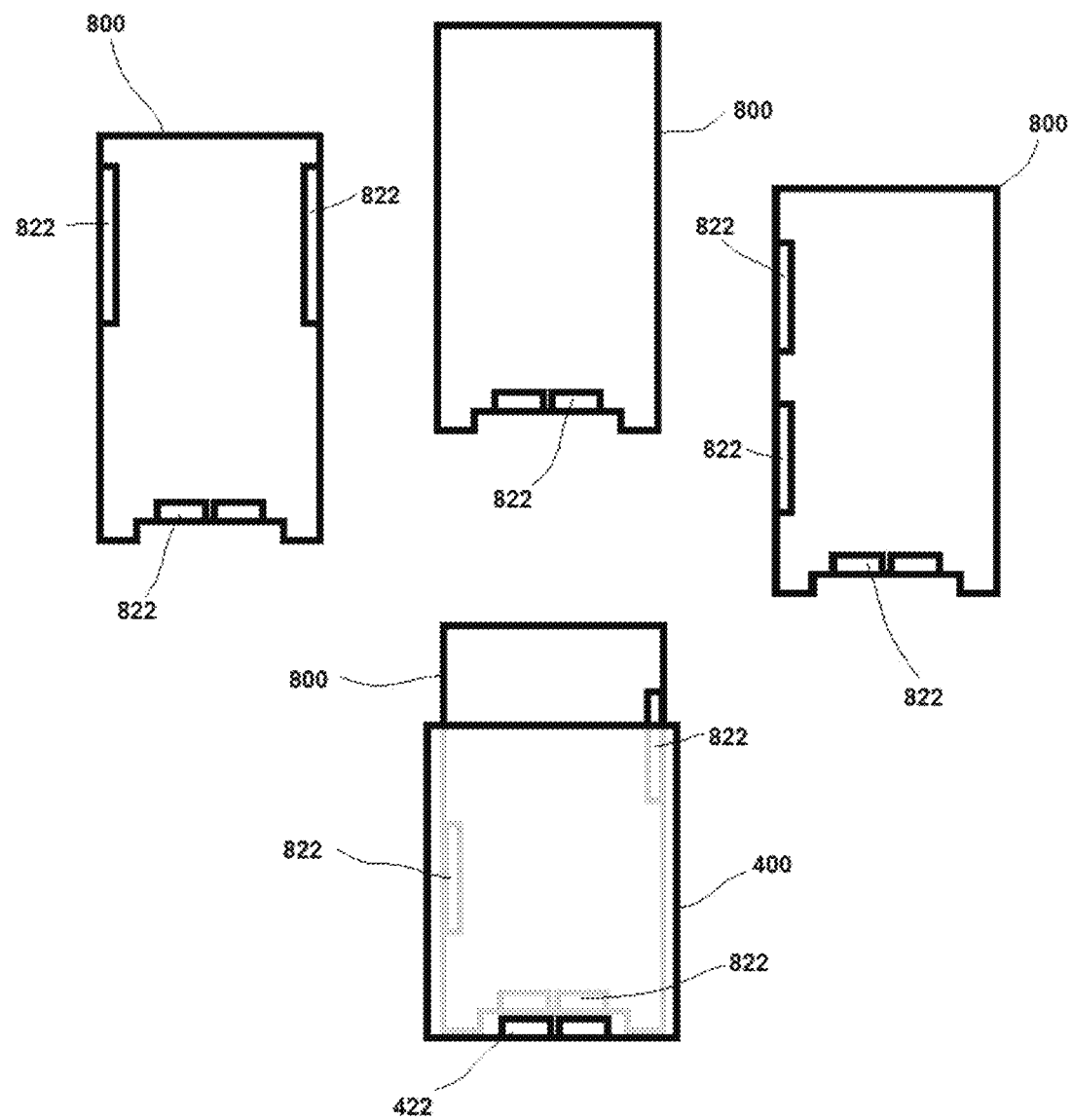
FIG. 5 depicts a schematic plan side view of various adapters, each with a different configuration of electrical contacts, with one adapter shown inserted into a generically configured power receptacle. The hidden elements of the inserted adapter are shown in gray.

As described above, different manufacturers of rechargeable battery packs 310 tend to use unique configurations regarding their insertion members 320 and electrical contacts 322. The device 1 can be configured with a power receptacle 400 specially adapted to any one manufacturer's configuration. However, the device 1 may also be configured to include a generically configured power receptacle 400 and one or more adapters 800. Each adapter 800 is suitably configured to be inserted into the power receptacle 400 and is further suitably configured to receive and retain the insertion member 320 of the rechargeable battery pack 310 of a specific manufacturer. Each adapter 800 further has electrical contacts 822 configured to engage with the electrical contacts 322 of the insertion members 320 of the specific manufacturer's rechargeable battery pack 310. See FIG. 5. The inner portion of the adapter 800 may have a circular cross section, a square cross section, a rectangular cross section, or any other shape, to accommodate the specific configuration of the intended insertion member 320. The exterior of the adapter 800 will always have a consistent shape, to properly engage with the generic power receptacle 400. Thus, for example, one adapter 800 may be configured to be inserted into the generically configured power receptacle 400 and to receive and retain the insertion member 320 of a Dewalt® rechargeable battery pack 310, while a second adapter 800 may be configured to receive and retain the insertion member 320 of a Ryobi® rechargeable battery pack 310. The inner configurations of the Dewalt® adaptor 800 may differ from the inner configurations of the Ryobi® adapter 800, but the outer configurations of both will be identical. This feature both improves convenience and enables the pump 100 to work with rechargeable batteries of different voltages for longer operating life and/or increased power, if desired.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A cordless portable pump device comprising
a submersible pump having a housing and an electric motor contained within the housing, the pump being suitable for taking in a fluid substance into the housing and expelling the fluid substance from the housing;
wires capable of conducting electrical current;
a power supply,
    the power supply comprising a rechargeable battery pack from a commercially available portable power tool having a voltage rating of at least fourteen volts, and
    the power supply having an insertion member, the insertion member having one or more electrical contacts thereupon, said one or more electrical contacts being in electrical engagement with the rechargeable battery pack;
a power receptacle,
    the power receptacle being in connection with the electric pump motor by the wires,
    the power receptacle being suitably adapted to receive and retain the insertion member of the power supply, and
    the power receptacle having one or more electrical contacts, with the one or more electrical contacts of the power receptacle suitably adapted to engage with the one or more electrical contacts of the insertion member of the power supply to establish an electrical connection from the power supply to the electric pump motor through the wires;
a switch,
    the switch being in connection with the power receptacle, the switch being suitable for controlling whether power is to be supplied to the electric motor of the pump, such that when the switch is placed into an on position power from the power supply is conveyed to the electric motor and the pump is operational, and when the switch is placed into an off position power from the power supply is not conveyed to the electric motor and the pump is not operational;
an extension member,
    the extension member being substantially elongate and having a proximate end, a distal end, and a hollow interior,
    the extension member being attached at its proximate end to the housing of the pump,
    with the power receptacle being integrated with the extension member at the distal end of the extension member, and
    the wires being contained substantially within the hollow interior of the extension member; and
a discharge hose,
    the discharge hose being in connection with the pump housing and capable of carrying away the fluid substance expelled by the pump.

2. The device of claim 1 wherein the rechargeable battery pack is a lithium ion rechargeable battery pack.

3. The device of claim 1 wherein the extension member is fixedly attached at its proximate end to the housing of the pump.

4. The device of claim 1 wherein the extension member is removably attached at its proximate end to the housing of the pump by use of a coupling member, such that the pump can be separated from the extension member.

5. The device of claim 1 wherein the extension member is constructed of polyvinyl chloride (PVC) pipe.

6. The device of claim 1 wherein the proximate end of the extension member has an aperture for the passage of the wires, said aperture being fitted with a rubber grommet.

7. The device of claim 1 wherein the extension member is comprised of a first component and a second component, with the first component being removably attached to the second component, such that detaching the first component from the second component provides access to the hollow interior of the extension member.

8. The device of claim 1 wherein the wires comprise a positive lead, a negative lead, and an inline fuse integrated with the positive lead.

9. The device of claim 1 further comprising a handle, the handle integrated with the extension member.

10. The device of claim 9 wherein the handle extends substantially perpendicularly from the extension member at a location at or near the distal end of the extension member.

11. The device of claim 9 wherein the switch is located on the handle.

12. A cordless portable pump device comprising
a submersible pump having a housing and an electric motor contained within the housing, the pump being suitable for taking in a fluid substance into the housing and expelling the fluid substance from the housing;
wires capable of conducting electrical current;
a power supply,
    the power supply comprising a rechargeable battery pack from a commercially available portable power tool having a voltage rating of at least fourteen volts, and
    the power supply having an insertion member, the insertion member having one or more electrical contacts thereupon, said one or more electrical contacts being in electrical engagement with the rechargeable battery pack;
a power receptacle,
    the power receptacle being in connection with the electric pump motor by the wires,
    the power receptacle being suitably adapted to receive and retain the insertion member of the power supply, and
    the power receptacle having one or more electrical contacts, with the one or more electrical contacts of the power receptacle suitably adapted to engage with the one or more electrical contacts of the insertion member of the power supply to establish an electrical connection from the power supply to the electric pump motor through the wires; and
one or more adapters, each said adapter being suitably configured to be inserted into the power receptacle and further being suitably configured to receive and retain the insertion member of the power supply, such that each said adapter provides an interface between the power supply and the power receptacle, with each said adapter configured to conform to a specific commercially available rechargeable battery pack for a portable power tool, whereby different commercially available rechargeable battery packs may be used with the device when coupled with an appropriately configured adapter.

13. A cordless portable pump device comprising a submersible pump having a housing and an electric motor contained within the housing, the pump being suitable for taking in a fluid substance into the housing and expelling the fluid substance from the housing;

wires capable of conducting electrical current, the wires comprised of a positive lead, a negative lead, and an inline fuse integrated with the positive lead;

a power supply,
  the power supply comprising a lithium ion rechargeable battery pack from a commercially available portable power tool having a voltage rating of at least fourteen volts, and
  the power supply having an insertion member, the insertion member having one or more electrical contacts thereupon, said one or more electrical contacts being in electrical engagement with the rechargeable battery pack;

a power receptacle,
  the power receptacle being in connection with the electric pump motor by the wires,
  the power receptacle being suitably adapted to receive the insertion member of the power supply, and
  the power receptacle having one or more electrical contacts, with the one or more electrical contacts of the power receptacle suitably adapted to engage with the one or more electrical contacts of the insertion member of the power supply to establish an electrical connection from the power supply to the electric pump motor through the wires;

a switch,
  the switch being in connection with the power receptacle, the switch being suitable for controlling whether power is to be supplied to the electric motor of the pump, such that when the switch is placed into an on position power from the power supply is conveyed to the electric motor and the pump is operational, and when the switch is placed into an off position power from the power supply is not conveyed to the electric motor and the pump is not operational;

an extension member,
  the extension member being substantially elongate and having a proximate end, a distal end, and a hollow interior,
  the extension member having a first component and a second component, with the first component being removably attached to the second component, such that detaching the first component from the second component provides access to the hollow interior of the extension member,
  the extension member being removably attached at its proximate end to the housing of the pump by a coupling member, such that the pump can be separated from the extension member,
  the extension member being constructed of polyvinyl chloride (PVC) pipe, with the proximate end of the extension member has an aperture for the passage of the wires, said aperture being fitted with a rubber grommet,
  with the power receptacle being integrated with the extension member at the distal end of the extension member, and
  the wires contained substantially within the hollow interior of the extension member;

a handle,
  the handle being integrated with the extension member,
  the handle extending substantially perpendicularly from the extension member at a location at or near the distal end of the extension member, and
  with the switch located on the handle; and a discharge hose,
  the discharge hose being in connection with the pump housing and being capable of carrying away the fluid substance expelled by the pump.

* * * * *